(12) United States Patent
Lee et al.

(10) Patent No.: US 11,533,743 B2
(45) Date of Patent: *Dec. 20, 2022

(54) METHOD FOR TERMINAL FOR CARRYING OUT UPLINK COMMUNICATION IN WIRELESS COMMUNICATION SYSTEM, AND TERMINAL USING METHOD

(71) Applicant: LG Electronics Inc., Seoul (KR)

(72) Inventors: Seungmin Lee, Seoul (KR); Suckchel Yang, Seoul (KR); Daesung Hwang, Seoul (KR); Kijun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,526

(22) Filed: Jan. 14, 2022

(65) Prior Publication Data
US 2022/0141855 A1 May 5, 2022

Related U.S. Application Data

(63) Continuation of application No. 16/787,780, filed on Feb. 11, 2020, now Pat. No. 11,229,040, which is a
(Continued)

(51) Int. Cl.
*H04L 12/28* (2006.01)
*H04W 72/12* (2009.01)
(Continued)

(52) U.S. Cl.
CPC ....... *H04W 72/1268* (2013.01); *H04W 72/04* (2013.01); *H04W 72/042* (2013.01); *H04W 72/046* (2013.01); *H04W 72/12* (2013.01)

(58) Field of Classification Search
CPC . H04W 52/10; H04W 52/146; H04W 52/242; H04W 52/04
(Continued)

(56) References Cited

U.S. PATENT DOCUMENTS 9,668,220 B2 * 5/2017 Gao ................... H04W 52/325
10,869,277 B2 12/2020 Liu
(Continued)

FOREIGN PATENT DOCUMENTS

CN 105103261 11/2015
CN 105281818 1/2016
(Continued)

OTHER PUBLICATIONS

Extended European Search Report in European Application No. 17837275.1, dated Dec. 18, 2019, 7 pages.
(Continued)

*Primary Examiner* — John Pezzlo
(74) *Attorney, Agent, or Firm* — Fish & Richardson P.C.

(57) ABSTRACT

Provided are a method for a terminal for carrying out uplink communication in a wireless communication system, and an apparatus using the method. The method receives an uplink communication-related parameter independently configured for each analog beam, and carries out the uplink communication on the basis of the parameter. If the uplink communication is carried out using a particular analog beam, then an uplink communication-related parameter configured on the particular analog beam is applied to the uplink communication.

15 Claims, 19 Drawing Sheets

Related U.S. Application Data continuation of application No. 16/265,459, filed on Feb. 1, 2019, now Pat. No. 10,575,322, which is a continuation of application No. PCT/KR2017/008418, filed on Aug. 3, 2017.

(60) Provisional application No. 62/373,434, filed on Aug. 11, 2016, provisional application No. 62/370,698, filed on Aug. 3, 2016.

(51) Int. Cl.
*H04W 72/04* (2009.01)
*H04J 1/16* (2006.01)

(58) Field of Classification Search
USPC .............................. 370/252, 311, 329, 430
See application file for complete search history.

(56) References Cited

U.S. PATENT DOCUMENTS

| | | | |
|---|---|---|---|
| 10,925,005 B2 | 2/2021 | Davydov et al. | |
| 2013/0072244 A1 | 3/2013 | Jeong et al. | |
| 2013/0301454 A1 | 11/2013 | Seol et al. | |
| 2013/0331081 A1 | 12/2013 | Rune et al. | |
| 2014/0161060 A1* | 6/2014 | Nam | H04L 1/1692 370/329 |
| 2014/0177607 A1 | 6/2014 | Li et al. | |
| 2014/0315594 A1 | 10/2014 | Jeong et al. | |
| 2014/0369328 A1 | 12/2014 | Park et al. | |
| 2015/0009951 A1 | 1/2015 | Josiam et al. | |
| 2015/0289281 A1 | 10/2015 | Kim et al. | |
| 2017/0195998 A1 | 7/2017 | Zhang et al. | |
| 2017/0026938 A1 | 11/2017 | Onggosanusi | |
| 2017/0332359 A1 | 11/2017 | Tsai | |
| 2018/0034515 A1 | 2/2018 | Guo | |
| 2019/0081688 A1 | 3/2019 | Deenoo | |
| 2019/0104549 A1 | 4/2019 | Deng | |
| 2019/0104550 A1 | 4/2019 | Yang | |
| 2019/0159230 A1 | 5/2019 | Kim | |
| 2020/0145079 A1 | 5/2020 | Marinier et al. | |

FOREIGN PATENT DOCUMENTS

| | | |
|---|---|---|
| CN | 105580448 | 5/2016 |
| CN | 105743824 | 7/2016 |
| EP | 3200498 | 8/2017 |
| WO | WO2005119936 A2 | 12/2005 |
| WO | WO2005119936 A3 | 4/2006 |
| WO | WO2015157565 | 10/2015 |
| WO | WO2016044994 | 3/2016 |
| WO | WO2016053426 | 4/2016 |
| WO | WO2016114199 | 7/2016 |

OTHER PUBLICATIONS

Huawei, HiSilicon, "Discussion on UL SRS transmission power", R1-1713769, 3GPP TSG RAN WG1 Meeting #90, Prague, Czech Republic, Aug. 21-25, 2017, 4 pages.

Intel Corporation, "Discussion on UL Power Control for Data Channel," R1-1707 422, 3GPP TSGRAN WG1 #89, Hangzhou, China, dated May 15-19, 2017, 5 pages.

Japanese Office Action in Japanese Application No. 2019-506119, dated Apr. 7, 2020, 10 pages (with English translation).

Samsung, "Overview on beam management," R1-1609080, 3GPP TSG RAN WG1 #86-bis, Lisbon, Portugal, dated Oct. 10-14, 2016, 5 pages.

ZTE, "Discussion on CSI Measurement and Feedback Related Configurations," R1-155260, 3GPP TSG RAN WG1 Meeting #82bis, Malmö, Sweden, dated Oct. 5-9, 2015, 5 pages.

3GPP TR 45.912 V1.0.0, "3rd Generation Partnership Project; Technical Specification Group GSM/EDGE Radio Access Network; Feasibility study for evolved GSM/EDGE Radio Access Network (GERAN)(Release 7)," Jul. 3, 2006, 498 pages.

Office Action in Chinese Application No. 201780047698.4, dated Mar. 18, 2022, 6 pages (with English translation).

Siemens, "Revision of Chapter 7 of TR 45.912," 3GPP TSG-GERAN Meeting #30, GP-061106, Lisbon, Portugal, Jun. 26-30, 2006, 56 pages.

\* cited by examiner

METHOD FOR TERMINAL FOR CARRYING OUT UPLINK COMMUNICATION IN WIRELESS COMMUNICATION SYSTEM, AND TERMINAL USING METHOD

CROSS-REFERENCE TO RELATED APPLICATIONS

This application is a continuation of U.S. application Ser. No. 16/787,780, filed on Feb. 11, 2020, which is a continuation of U.S. application Ser. No. 16/265,459, filed on Feb. 1, 2019, now U.S. Pat. No. 10,575,322, which is a continuation pursuant to 35 U.S.C. § 119(e) of International Application PCT/KR2017/008418, with an international filing date of Aug. 3, 2017, which claims the benefit of U.S. Provisional Application No. 62/370,698, filed on Aug. 3, 2016, and U.S. Provisional Application No. 62/373,434, filed on Aug. 11, 2016, the contents of which are hereby incorporated by reference herein in their entirety.

BACKGROUND OF THE INVENTION

Field of the Invention

The present invention relates to wireless communication and, more particularly, to a method for performing uplink communication by a terminal in a wireless communication system and a terminal using the method.

Related Art

As communication devices have increasingly required greater communication capacity, the necessity for improved mobile broadband communication, relative to an existing radio access technology (RAT), has emerged. Also, massive machine type communications (MTC), which provides many different services by connecting multiple devices and objects, is also one of the major issues to be considered in next generation communications.

A communication system considering services or terminals vulnerable to reliability or latency has also been discussed, and a next-generation RAT considering improved mobile broadband communication, massive MTC, ultra-reliable and low latency communication (URLLC), and the like, may also be termed a new RAT or new radio (NR).

NR considers communication considering analog beamforming, as well as digital beamforming.

Digital beamforming may be performing precoding at a baseband end, and analog beamforming may be performing precoding at an RF (radio frequency) end. A beam which has passed through digital beamforming may be referred to as a digital beam, and a beam which has passed through analog beamforming may be referred to as an analog beam.

In the NR, when an analog beam-based uplink channel/signal transmission is performed, a method for setting an uplink communication-related parameter capable of obtaining high reliability of uplink channels/signals transmitted through analog beams of different characteristics/environments and effectively operating or scheduling resources for each analog beam is required and a method for uplink communication of a terminal (i.e., user equipment (UE)) based on the method is required.

SUMMARY OF THE INVENTION

An object of the present invention is to provide for performing uplink communication by a terminal in a wireless communication system and a terminal using the method.

In one aspect, provided is a method for performing uplink communication by a terminal in a wireless communication system. The method includes receiving an uplink communication-related parameter independently configured for each analog beam and performing the uplink communication based on the parameter. When the uplink communication is performed using a specific analog beam, an uplink communication-related parameter configured for the specific analog beam is applied to the uplink communication.

The UE may receive a plurality of analog beams from a base station (BS), and measure the plurality of analog beams and transmit a measurement result of some of the plurality of analog beams to the BS.

The analog beam may include a beam reference signal (BRS).

The beam reference signal may include an identity (ID) distinguished for each analog beam.

The uplink communication-related parameter configured for the specific analog beam may include an offset value which determines a modulation and coding scheme (MCS) applied when uplink control information is applied.

The uplink communication-related parameter configured for the specific analog beam may include at least one of resource of an uplink control channel for transmission of uplink control information, a format of the uplink control channel, a transmission technique of the uplink control channel, and a seed value related to generation of a reference signal sequence of the uplink control channel.

The uplink communication-related parameter configured for the specific analog beam may include at least one of a power offset value applied to transmission of a sounding reference signal (SRS), a power offset value applied for each uplink control channel format, a power offset value applied to an uplink control channel transmit diversity technique, and a power offset value according to a magnitude of uplink control information payload.

The uplink communication-related parameter configured for the specific analog beam may include an uplink semi-persistent scheduling configuration information for each analog beam.

The uplink communication-related parameter configured for the specific analog beam may include at least one of information regarding resource and transmission type of a sounding reference signal (SRS), uplink transmission mode information, and timing advanced (TA) information.

An uplink semi-persistent scheduling operation may be allowed only in some of the plurality of analog beams configured in the terminal.

The uplink communication-related parameter independently configured for each analog beam may be configured to have the same value for some analog beams and different values for the other analog beams.

In another aspect, provided is a user equipment (UE). The UE includes a radio frequency (RF) unit transmitting and receiving a wireless signal and a processor coupled to the RF unit to operate. The processor receives an uplink communication-related parameter independently configured for each analog beam, and performs the uplink communication based on the parameter. When the uplink communication is performed using a specific analog beam, an uplink communication-related parameter configured for the specific analog beam is applied to the uplink communication.

In NR, independent uplink communication-related parameters may be set for each analog beam. Therefore, when analog beam-based uplink channel/signal transmission is performed, high reliability of uplink channels/signals transmitted through analog beams of different characteristics/environments may be obtained and resources may be effectively operated or scheduled for each analog beam.

DESCRIPTION OF EXEMPLARY EMBODIMENTS

Figure 1:
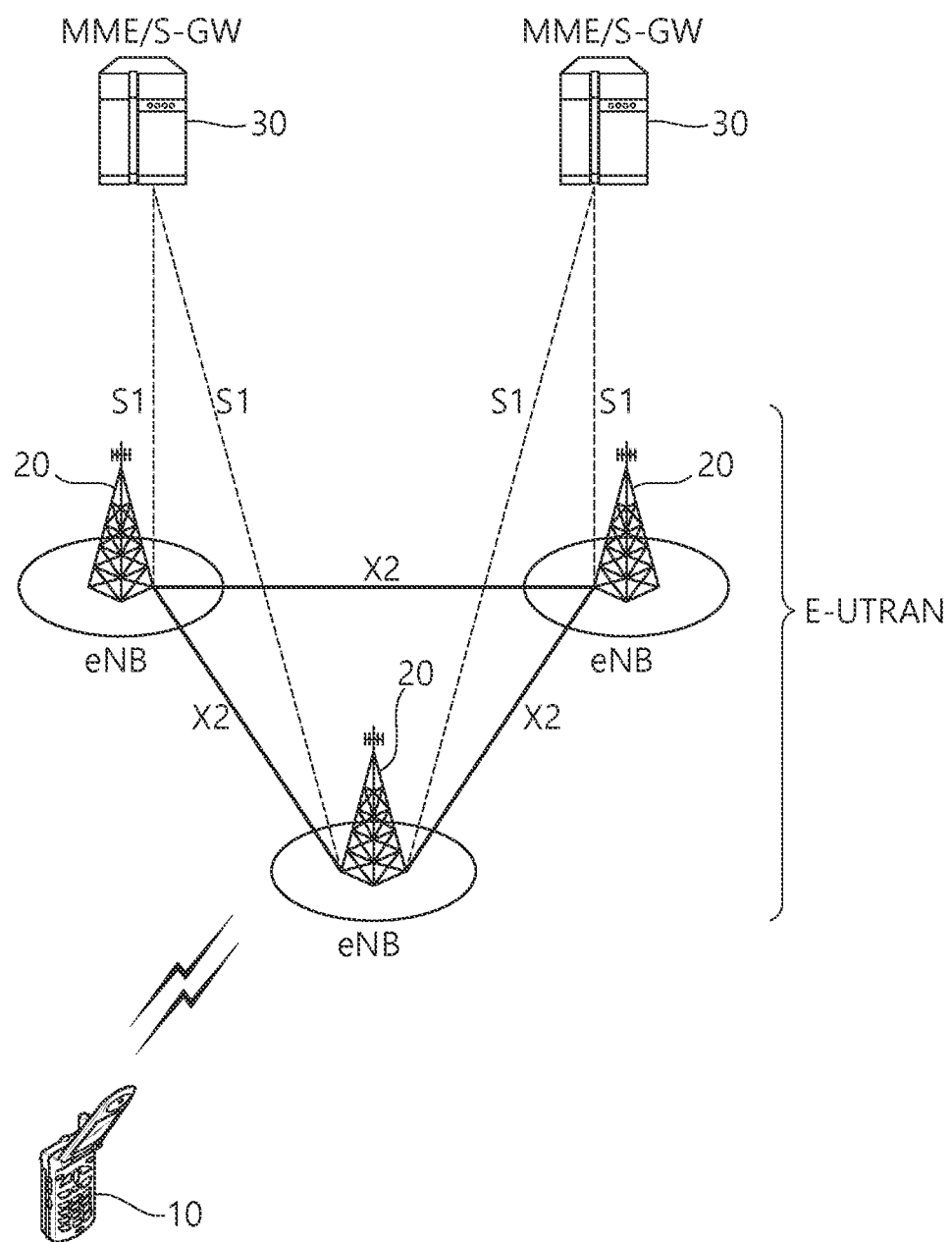
FIG. 1 shows a conventional wireless communication system.

FIG. 1 shows a conventional wireless communication system. The wireless communication system may be referred to as an Evolved-UMTS Terrestrial Radio Access Network (E-UTRAN) or a Long Term Evolution (LTE)/LTE-A system, for example.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
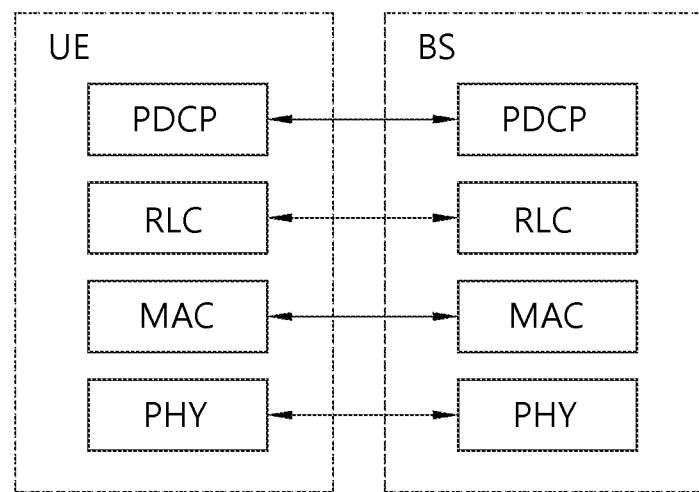
FIG. 2 is a diagram showing a radio protocol architecture for a user plane.
Figure 3:
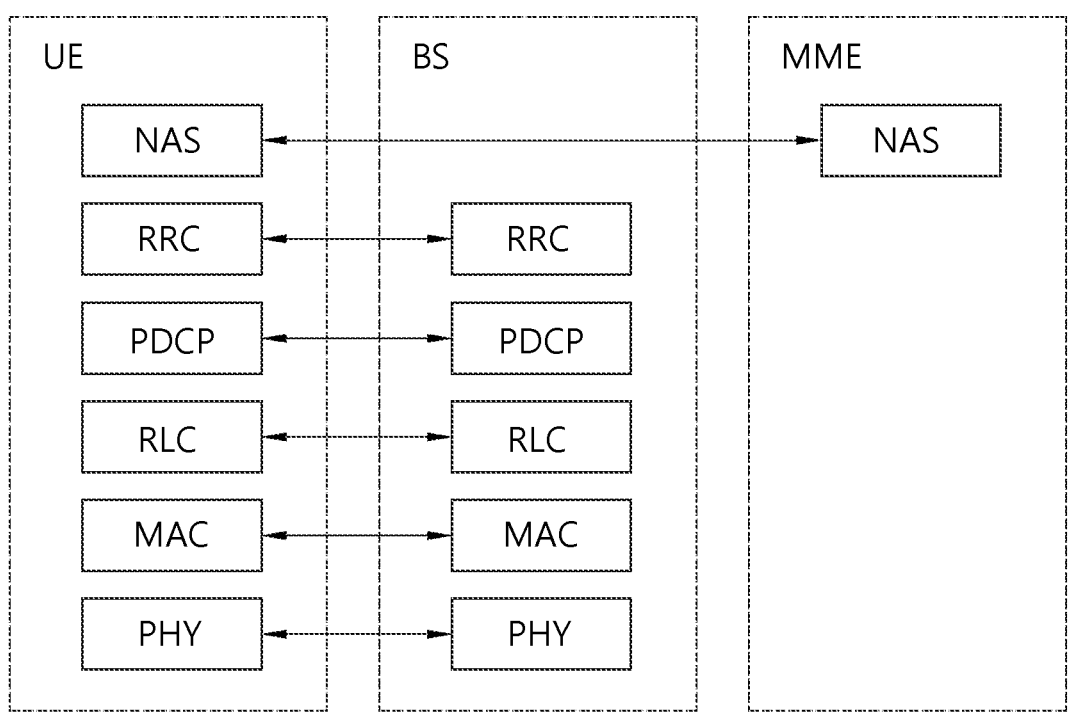
FIG. 3 is a diagram showing a radio protocol architecture for a control plane.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a process of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT) or new radio (NR) will be described.

As communication devices have increasingly required greater communication capacity, the necessity for improved mobile broadband communication, relative to an existing radio access technology (RAT), has emerged. Also, massive machine type communications (MTC), which provides many different services by connecting multiple devices and objects, is also one of the major issues to be considered in next generation communications. In addition, a communication system design considering services or terminals vulnerable to reliability or latency has also been discussed. An introduction of a next-generation RAT considering enhanced mobile broadband communication, massive MTC, ultra-reliable and low latency communication (URLLC), and the like, has been discussed, and in this disclosure, for the purposes of description, the corresponding technology will be termed new RAT or new radio (NR).

Figure 4:
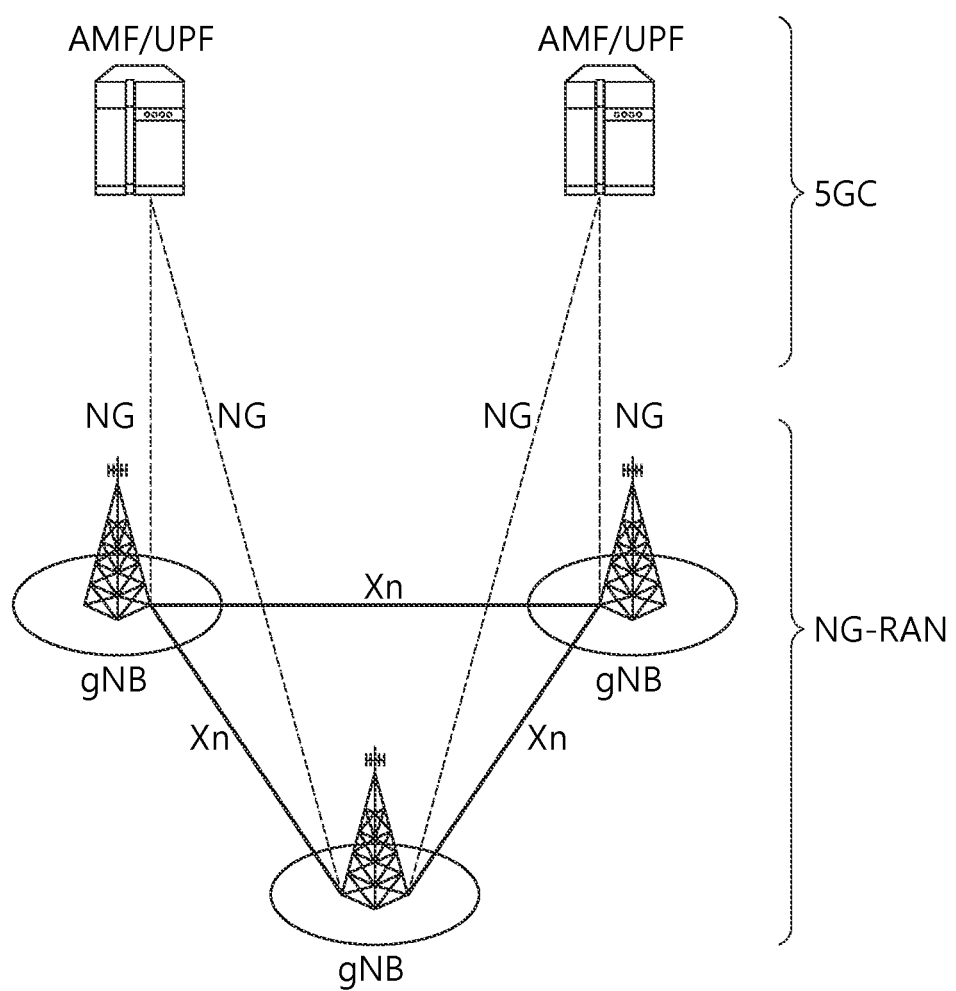
FIG. 4 illustrates a system structure of a next generation radio access network (NG-RAN) to which NR is applied.

FIG. 4 illustrates a system structure of a next generation radio access network (NG-RAN) to which NR is applied.

Referring to FIG. 4, the NG-RAN may include a gNB and/or an eNB that provides user plane and control plane protocol termination to a terminal. FIG. 4 illustrates the case of including only gNBs. The gNB and the eNB are connected by an Xn interface. The gNB and the eNB are connected to a 5G core network (5GC) via an NG interface. More specifically, the gNB and the eNB are connected to an access and mobility management function (AMF) via an NG-C interface and connected to a user plane function (UPF) via an NG-U interface.

Figure 5:
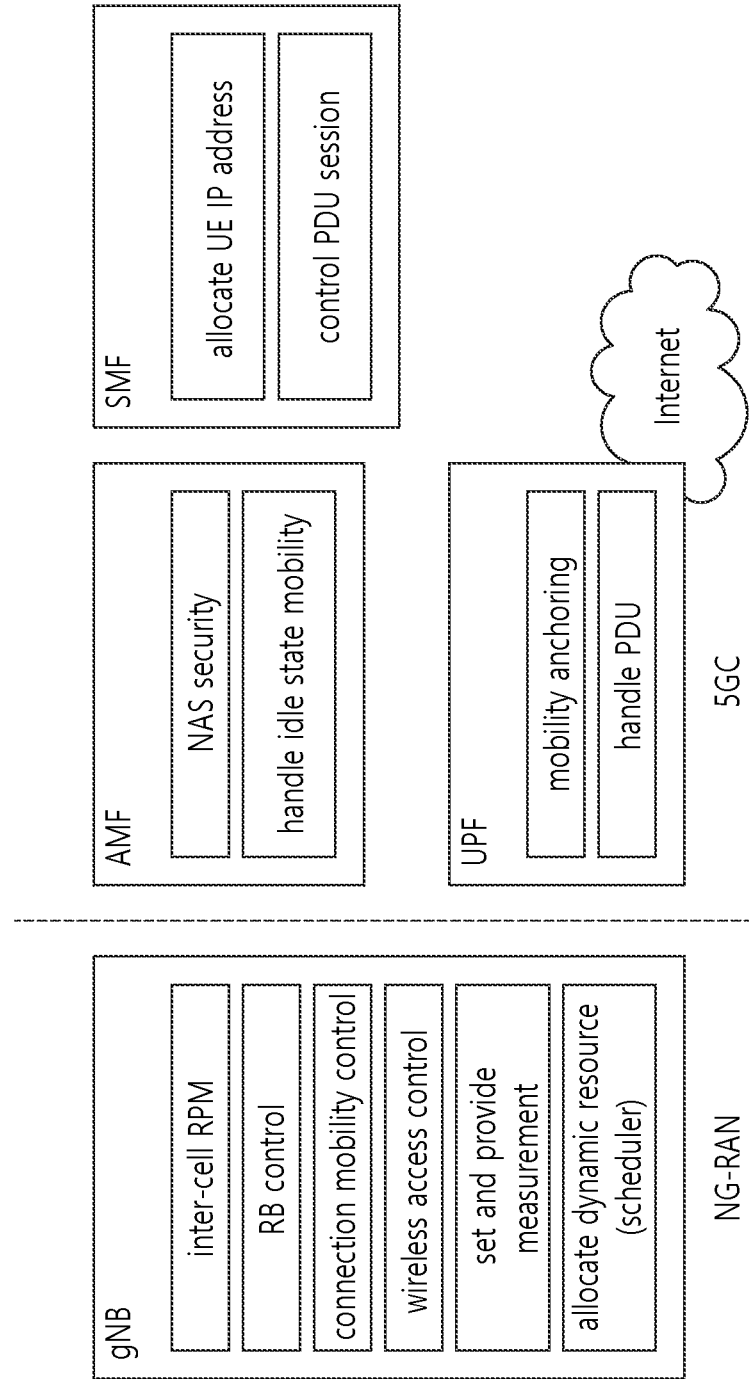
FIG. 5 illustrates a functional partition between NG-RAN and 5GC.

FIG. 5 illustrates a functional partition between NG-RAN and 5GC.

Referring to FIG. 5, the gNB may provide functions such as an inter-cell radio resource management (Inter Cell RRM), radio bearer management (RB control), connection mobility control, radio admission control, measurement configuration & provision, dynamic resource allocation, and the like. The AMF may provide functions such as NAS security, idle state mobility handling, and so on. The UPF may provide functions such as mobility anchoring, PDU processing, and the like. A session management function (SMF) may provide functions such as terminal (or a UE) IP address allocation, PDU session control, and the like.

In NR, the following technologies/features can be applied.

<Self-Contained Subframe Structure>

Figure 6:
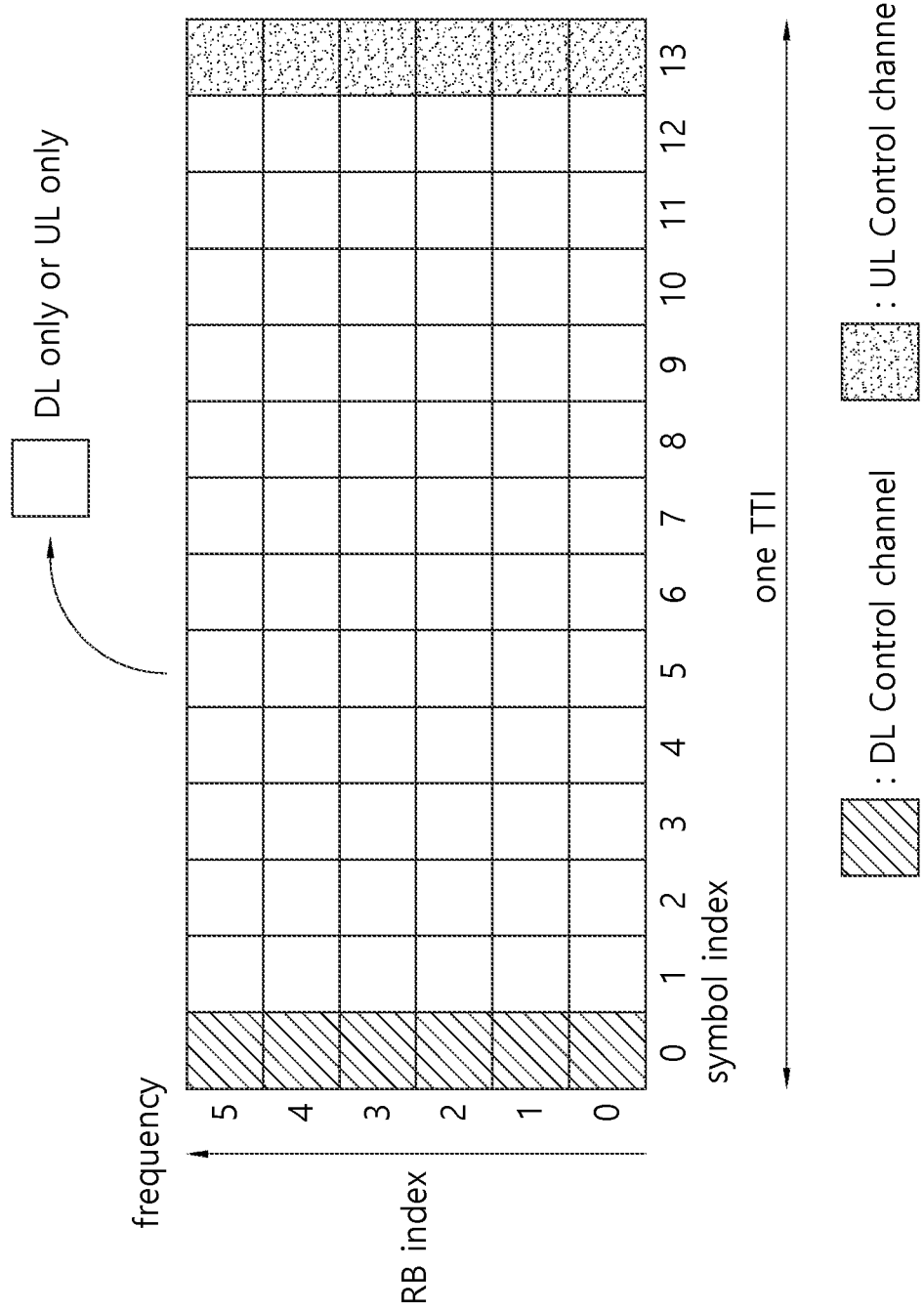
FIG. 6 illustrates an example of a frame structure for a new radio access technology.

FIG. 6 illustrates an example of a frame structure that can be used in new radio access technology.

In NR, a structure in which a control channel and a data channel are time-division-multiplexed within one TTI, as shown in FIG. 6, can be considered as a frame structure in order to minimize latency.

In FIG. 6, a shaded region represents a downlink control region and a black region represents an uplink control region. The remaining region may be used for downlink (DL) data transmission or uplink (UL) data transmission. This structure is characterized in that DL transmission and UL transmission are sequentially performed within one subframe and thus DL data can be transmitted and UL ACK/NACK can be received within the subframe. Consequently, a time required from occurrence of a data transmission error to data retransmission is reduced, thereby minimizing latency in final data transmission.

In this self-contained subframe structure, a time gap for a base station and a terminal to switch from a transmission mode to a reception mode or from the reception mode to the transmission mode may be required. To this end, some OFDM symbols at a time when DL switches to UL may be set to a guard period (GP) in the self-contained subframe structure.

<Analog Beamforming #1>

Wavelengths are shortened in millimeter wave (mmW) and thus a large number of antenna elements can be installed in the same area. That is, the wavelength is 1 cm at 30 GHz and thus a total of 64 (8×8) antenna elements can be installed in the form of a 2-dimensional array at an interval of 0.5 lambda (wavelength) in a panel of 4×4 cm. Accordingly, it is possible to increase a beamforming (BF) gain using a large number of antenna elements to increase coverage or improve throughput in mmW.

In this case, if a transceiver unit (TXRU) is provided to adjust transmission power and phase per antenna element, independent beamforming per frequency resource can be performed. However, installation of TXRUs for all of about 100 antenna elements decreases effectiveness in terms of cost. Accordingly, a method of mapping a large number of antenna elements to one TXRU and controlling a beam direction using an analog phase shifter is considered. Such analog beamforming can form only one beam direction in all bands and thus cannot provide frequency selective beamforming.

Hybrid beamforming (BF) having a number B of TXRUs which is smaller than Q antenna elements can be considered as an intermediate form of digital BF and analog BF. In this case, the number of directions of beams which can be simultaneously transmitted are limited to B although it depends on a method of connecting the B TXRUs and the Q antenna elements.

Figure 7:
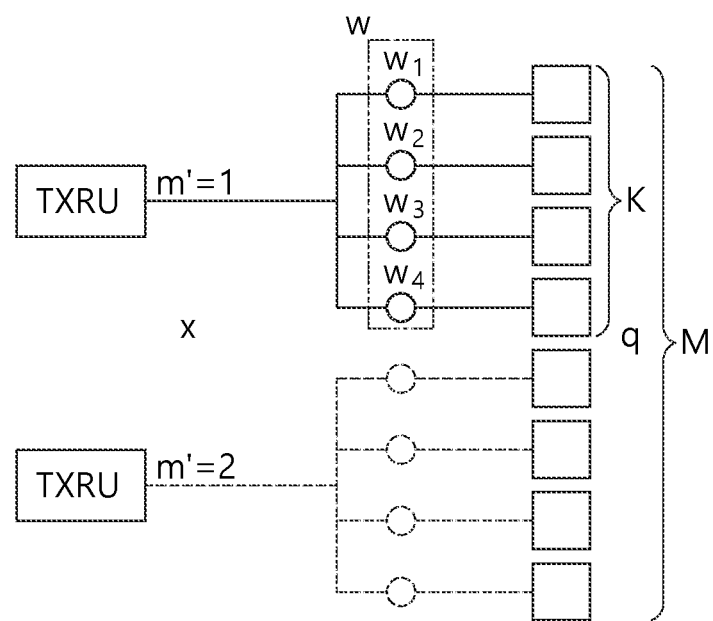
FIGS. 7 and 8 illustrate examples of a method of connecting an TXRU and antenna elements.
Figure 8:
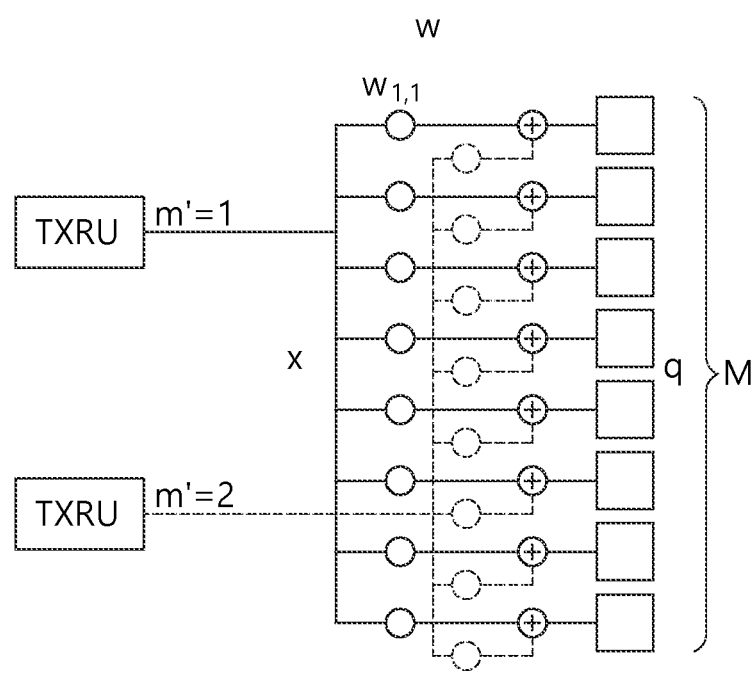

FIGS. 7 and 8 illustrate examples of a method of connecting TXRU and antenna elements.

Here, a TXRU virtualization model represents a relationship between an output signal of the TXRU and an output signal of the antenna elements.

FIG. 7 illustrates a scheme in which a TXRU is connected to a sub-array. In this case, the antenna elements are connected to only one TXRU. In contrast, FIG. 8 illustrates a scheme in which the TXRU is connected to all the antenna elements. In this case, the antenna elements are connected to all the TXRUs. In the drawing, W represents a phase vector multiplied by an analog phase shifter. That is, a direction of analog beamforming is determined by W. Here, mapping between CSI-RS antenna ports and the TXRUs may be 1-to-1 or 1-to-many.

<Analog Beamforming #2)>

When a plurality of antennas is used in NR, hybrid beamforming which is a combination of digital beamforming and analog beamforming may be used.

Here, analog beamforming (or RF beamforming) refers to an operation of performing precoding (or combining) at an RF end. In hybrid beamforming, a baseband end and an RF end perform precoding (or combining) and thus it is possible to achieve the performance similar to digital beamforming while reducing the number of RF chains and the number of D/A (or A/D) converters.

Figure 9:
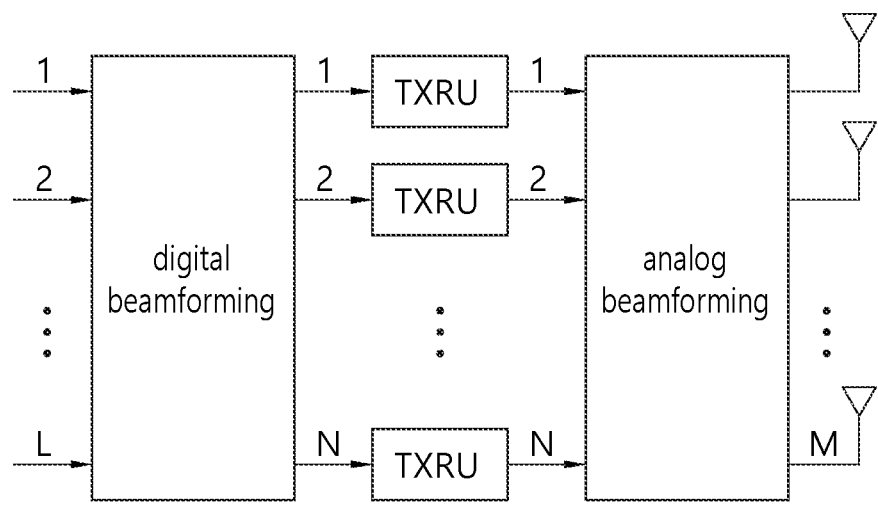
FIG. 9 is an abstract schematic diagram illustrating hybrid beamforming structure from the viewpoint of TXRUs and physical antennas.

FIG. 9 is an abstract schematic diagram illustrating hybrid beamforming from the viewpoint of TXRUs and physical antennas.

A hybrid beamforming structure can be represented by N transceiver units (TXRUs) and M physical antennas. Then, digital beamforming for L data layers to be transmitted by a transmission end can be represented by an N×L matrix, and N converted digital signals are converted into analog signals through the TXRUs and then analog beamforming represented by M×N matrix is applied to the analog signals.

In the NR system, base stations are designed to be able to change analog beamforming in units of symbols to support more efficient beamforming for terminals located in a specific area. Furthermore, a method of introducing a plurality of antenna panels to which independently hybrid beamforming is applicable is also considered in the NR system when N specific TXRUs and M RF antennas are defined as one antenna panel in FIG. 9.

When a base station uses a plurality of analog beams as described above, analog beams suitable to receive signals may be different for terminals and thus a beam sweeping operation of sweeping a plurality of analog beams to be applied by a base station per symbol in a specific subframe (SF) for at least a synchronization signal, system information and paging such that all terminals can have reception opportunities is considered.

Figure 10:
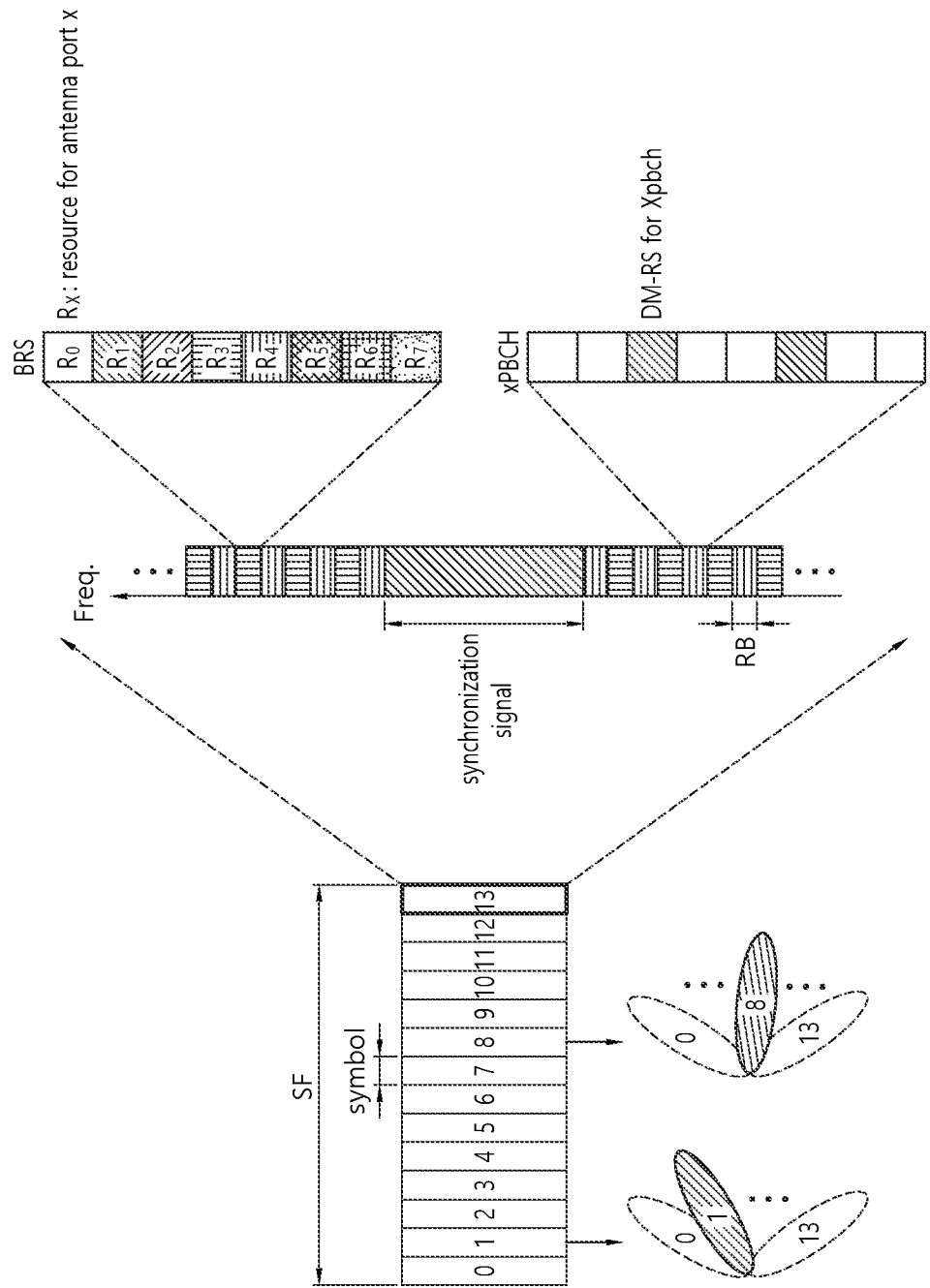
FIG. 10 illustrates the beam sweeping operation for a synchronization signal and system information in a downlink (DL) transmission procedure.

FIG. 10 illustrates the beam sweeping operation for a synchronization signal and system information in a downlink (DL) transmission procedure.

In FIG. 10, physical resources (or a physical channel) in which system information of the NR system is transmitted in a broadcasting manner is referred to as a physical broadcast channel (xPBCH). Here, analog beams belonging to different antenna panels can be simultaneously transmitted within one symbol, and a method of introducing a beam reference signal (BRS) which is a reference signal (RS) to which a single analog beam (corresponding to a specific antenna panel) is applied in order to measure a channel per analog beam, as illustrated in FIG. 10, is under discussion. The BRS can be defined for a plurality of antenna ports, and each antenna port of the BRS can correspond to a single analog beam. Here, all analog beams in an analog beam group are applied to the synchronization signal or xPBCH and then the synchronization signal or xPBCH is transmitted such that an arbitrary terminal can successively receive the synchronization signal or xPBCH.

<Panel Array Antenna>

Figure 11:
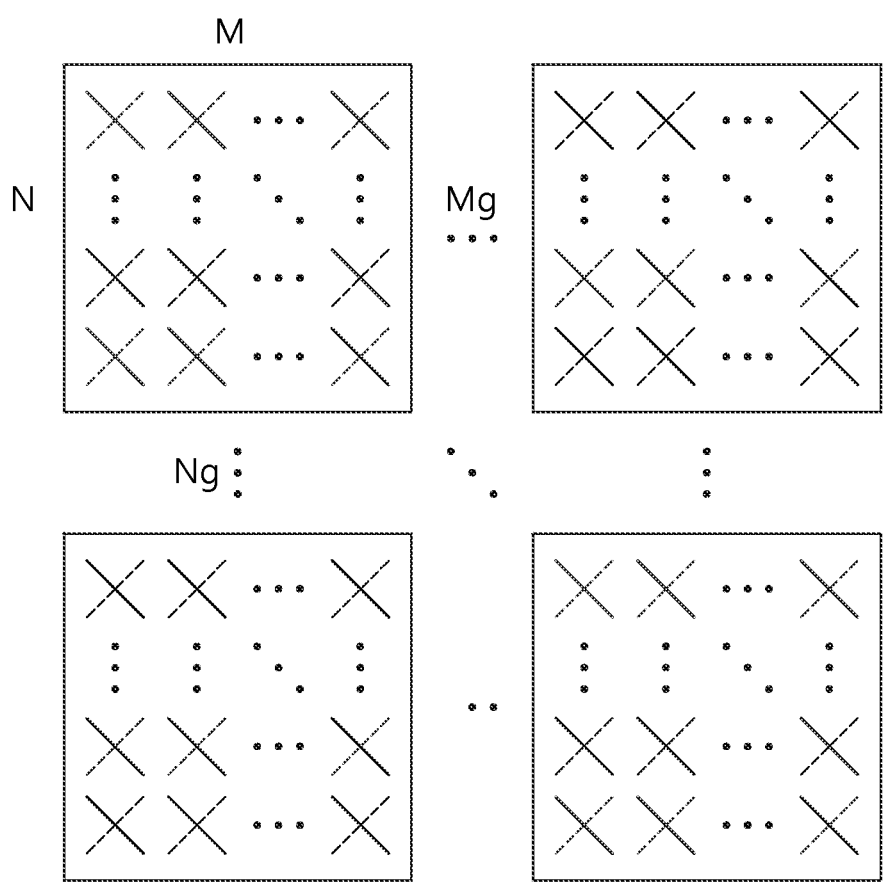
FIG. 11 schematically illustrates an example of a panel antenna array.

FIG. 11 schematically illustrates an example of a panel antenna array.

Referring to FIG. 11, a generalized panel antenna array may include Mg panels and Ng panels in a horizontal domain and a vertical domain, respectively. One panel includes M columns and N rows, and an X-pol antenna is assumed in the above example. Thus, a total number of the antenna elements is 2*M*N*Mg*Ng.

<Feedback of Channel State Information (CSI)>

In the 3GPP LTE (-A) system, a UE is defined to report CSI to a base station (BS), and here, CSI generally refers to information indicating quality of a radio channel (or a link) formed between a UE and an antenna port.

For example, a rank indicator (RI), a precoding matrix indicator (PMI), a channel quality indicator (CQI), and the like, correspond to the CSI. Here, RI denotes rank information of a channel, which indicates the number of streams that the UE receives through the same time-frequency resource. Since this value is determined dependently on long term fading of a channel, it generally has a period longer than that of the PMI and CQI and is fed back from the UE to the BS. The PMI is a value reflecting channel space characteristics and indicates a pre-coding index preferred by the UE on the basis of a metric such as a signal-to-interference-plus-noise ratio (SINR). The CQI is a value indicating strength of a channel and generally refers to a reception SINR that may be obtained when the BS uses the PMI.

In the 3GPP LTE (-A) system, the BS may set a plurality of CSI processes for the UE and may be reported a CSI for each process. Here, the CSI process includes a CSI-RS for signal quality measurement from the BS and a CSI-interference measurement (CSI-IM) resource for interference measurement.

<Virtualization of Reference Signal (RS))>

A physical downlink shared channel (PDSCH) may be transmitted only in one analog beam direction at a time point by analog beamforming at mmW. Therefore, data may be transmitted from the BS only to a small number of terminals present in the corresponding direction. Therefore, by setting different directions of the analog beam for each antenna port as necessary, data may be simultaneously transmitted to a plurality of terminals in the directions of the analog beam.

Figure 12:
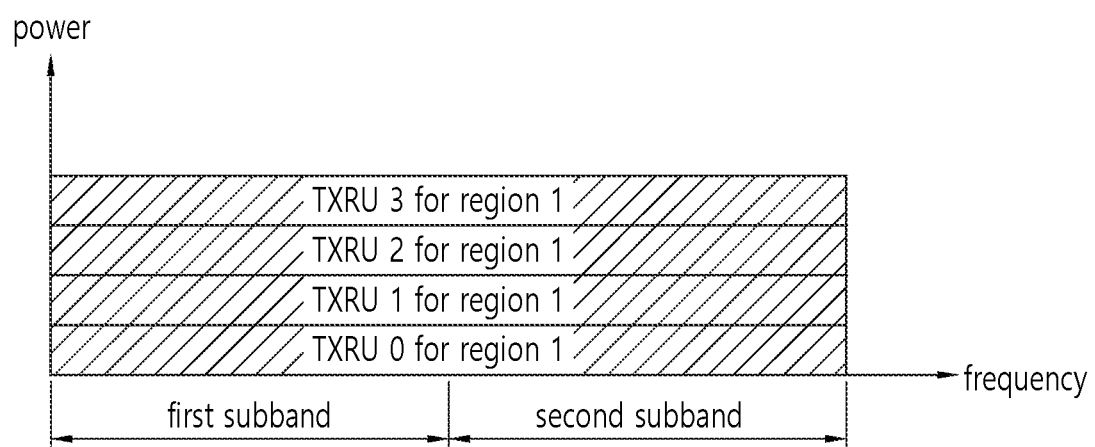
FIG. 12 schematically illustrates an example of a service region for each TXRU when all TXRUs have the same analog beamforming direction.
Figure 13:
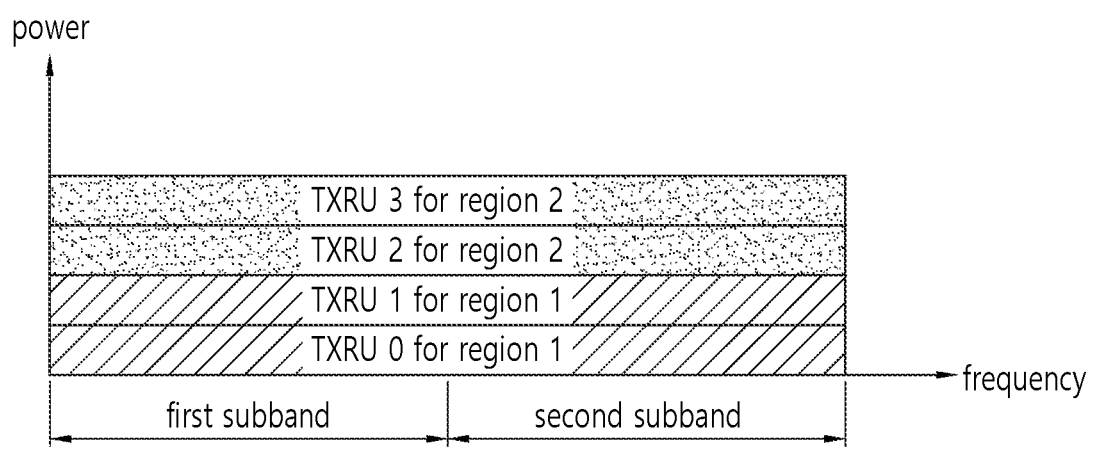
FIG. 13 schematically illustrates an example of a service region for each TXRU when the respective TXRUs have different analog beamforming directions.
Figure 14:
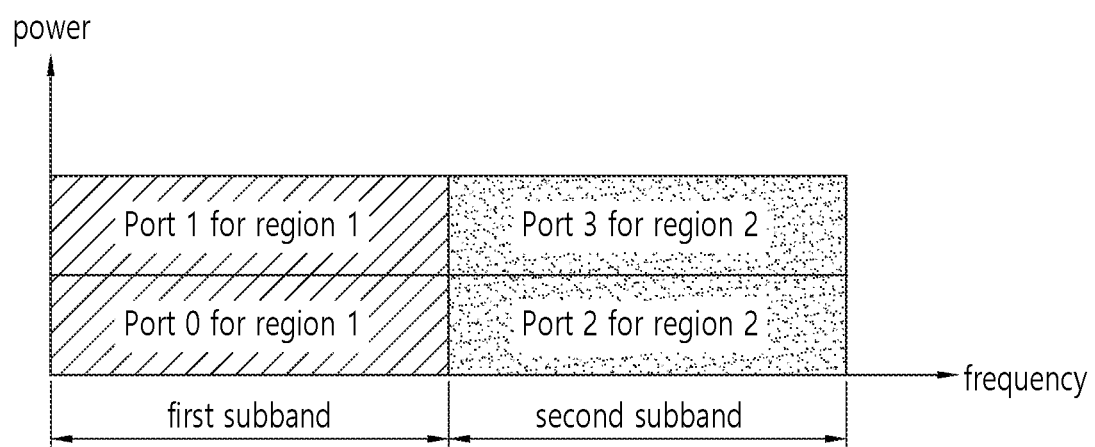
FIG. 14 schematically illustrates an example in which PDSCH1 transmitted to UE1 and PDSCH2 transmitted to UE2 are frequency-division-multiplexed (FDM-ed) and transmitted.

Hereinafter, a structure in which 256 antenna elements are quartered to form four sub-arrays and a TXRU is connected to the sub-arrays as illustrated in FIGS. 12 to 14 will be described as an example.

When each sub-array includes a total of 64 (8×8) antenna elements in the form of a 2-dimension array, an area corresponding to a horizontal angle region of 15° and a vertical angle region of 15° may be covered by specific analog beamforming. That is, an area to be served by the BS is divided into a plurality of regions and the BS serves one region at a time. In the following description, it is assumed that a CSI-RS antenna fork and a TXRU are mapped in a 1-to-1 manner. Therefore, the antenna port and TXRU have the same meaning in the following description.

FIG. 12 schematically illustrates an example of a service region for each TXRU when all TXRUs have the same analog beamforming direction.

If all TXRUs (antenna ports, sub-arrays) have the same analog beamforming direction as illustrated in FIG. 12, a digital beam having a higher resolution may be formed to increase throughput of the corresponding area. Also, a rank of transmission data to the corresponding area may be increased to increase throughput of the corresponding area.

FIG. 13 schematically illustrates an example of a service region for each TXRU when each TXRU has different analog beamforming directions.

If the TXRUs (antenna port, sub-array) have different analog beamforming directions as illustrated in FIG. 13, data may be simultaneously transmitted in corresponding subframes (SFs) to UEs distributed in a wider region. As illustrated in the figure, two of the four antenna ports may be used for PDSCH transmission to UE1 in region 1 and the remaining two may be used for PDSCH transmission to UE2 in region 2. As in the example of the drawing, two antenna ports, among four antenna ports, may be used for PDSCH transmission to UE1 present in region 1 and the other two antenna ports may be used for PDSCH transmission to UE2.

FIG. 14 schematically illustrates an example in which PDSCH1 transmitted to the UE1 and PDSCH2 transmitted to the UE2 are FDM-ed and transmitted.

FIG. 13 described above illustrates an example in which PDSCH 1 transmitted to UE 1 and PDSCH 2 transmitted to UE 2 are spatial division multiplexed (SDM-ed). In contrast, as illustrated in FIG. 14, the PDSCH1 transmitted to the UE1 and the PDSCH2 transmitted to the UE2 may be FDM-ed and transmitted.

Among a scheme of serving one region using all the antenna ports and a scheme of serving several regions by dividing antenna ports, a preferred scheme is changed according to a RANK and MCS for serving a UE to maximize cell throughput. Also, a preferred scheme may be changed depending on the amount of data to be transmitted to each UE.

The BS calculates a cell throughput or a scheduling metric which may be obtained when one region is served using all the antenna ports and calculates a cell throughput or a scheduling metric which may be obtained when two regions are served by dividing antenna ports. The BS compares the cell throughputs or the scheduling metrics which may be obtained through the respective schemes and select a final transmission scheme. As a result, the number of antenna ports participating in the PDSCH transmission SF-by-SF is changed. CSI feedback from the UE is required in order for the BS to calculate transmission MCSs of the PDSCH according to the number of antenna ports and reflect the calculated transmission MCSs in a scheduling algorithm.

<Phase Noise>

Jitter on a time axis is defined as phase noise on a frequency axis. The phase noise randomly changes a phase of a reception signal of the time axis as follows.

$$r_n = s_n\, e^{j\phi_n} \quad \text{[Equation 1]}$$

$$\text{where } s_n = \sum_{k=0}^{N-1} d_k e^{j2\pi \frac{kn}{N}}$$

In the above equation, $r_n$, $s_n$, $d_k$, $\phi_n$ represent a reception signal, a time axis signal, a frequency axis signal, and a phase rotation value due to phase noise, respectively. When the reception signal undergoes a discrete Fourier transform (DFT), it may be expressed as follows.

$$y_k = d_k \frac{1}{N}\sum_{n=0}^{N-1} e^{j\phi_n} + \frac{1}{N}\sum_{\substack{t=0 \\ t\neq k}}^{N-1} d_t \sum_{n=0}^{N-1} e^{j\phi_n} e^{j2\pi(t-k)m/N} \quad \text{[Equation 2]}$$

In the above equations, $$\frac{1}{N}\sum_{n=0}^{N-1} e^{j\phi_n},\ \frac{1}{N}\sum_{\substack{t=0 \\ t\neq k}}^{N-1} d_t \sum_{n=0}^{N-1} e^{j\phi_n} e^{j2\pi(t-k)m/N}$$

represent a common phase error (CPE) and an ICI, respectively. Here, as correlation between the phase noises is greater, the CPE has a larger value.

<Embodiment of Phase Compensation Reference Signal (PCRS)>

Figure 15:
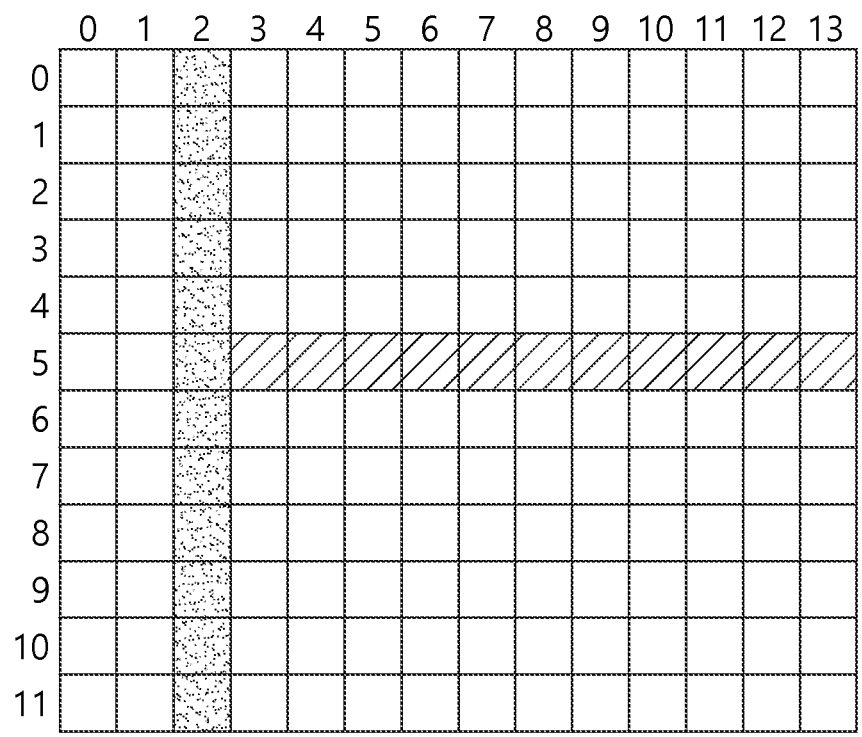
FIG. 15 schematically illustrates an example of a PCRS.

FIG. 15 schematically illustrates an example of a PCRS.

In FIG. 15, a PCRS for port 0 is defined in a fifth subcarrier. The PCRS is successively defined in the time axis and thus a phase difference between different time-axis OFDM symbols may be estimated. The remainder excluding demodulation reference signals (DMRS) and the PCRS represents a general PDSCH or a PDCCH.

Hereinafter, the present invention will be described.

The proposed schemes to be described hereinafter propose methods of effectively setting (/signaling) (uplink communication-related) parameters for each analog beam (or BRS ID) when an uplink channel/signal transmission (switching) based on a plurality of preset or signaled analog beams (or IDs of beam reference signals (BRS) in an new RAT (NR) system.

In the present invention, for example, the term "analog beam" may extendedly interpreted as "(digital) beam (index)" and/or a "reference signal resource (e.g., antenna port, LAYER index, (time/frequency) resource pattern, etc.) (which associated with a beam (index)" and/or a "(virtual) cell (identifier (index))", and the like.

Figure 16:
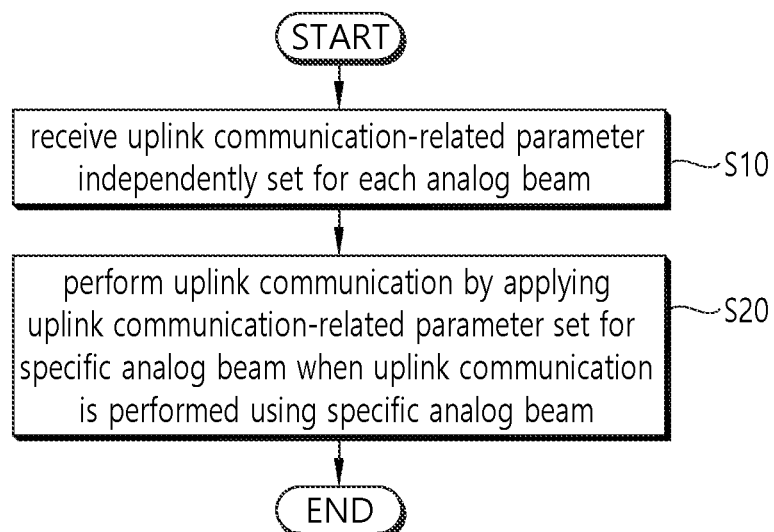
FIG. 16 is a flowchart illustrating a method for performing uplink communication of a terminal according to the present invention.

FIG. 16 illustrates a method for performing uplink communication of a terminal according to the present invention.

Referring to FIG. 16, a terminal receives an uplink communication parameter independently configured for each analog beam (S10). For example, when a plurality of analog beams are configured for the terminal, an uplink communication parameter having the same value may be configured for some analog beams and the uplink communication parameters having different values may be configured for the other analog beams. Or, uplink communication parameters having different values may be configured for all analog beams, respectively. That is, an uplink communication parameter value is configured independently for each analog beam.

When the terminal performs uplink communication using a specific analog beam, the terminal performs the uplink communication by applying an uplink communication-related parameter configured for the specific analog beam (S20).

For example, when the terminal transmits a PUSCH using a first analog beam, a first uplink communication parameter is applied, and when the terminal transmits the PUSCH using a second analog beam, a second uplink communication parameter is applied. Here, since the first and second uplink communication parameters are set in consideration of characteristics/environment of each analog beam, uplink communication may be more efficiently performed.

Referring to reception power (beam reference signal received power (BRSRP)) information of K higher beam reference signals previously measured/reported by the terminal, the BS may set (/signal) an uplink channel/signal transmission (switching) operation (/mode) based on M (K≤≤M) analog beams (or BRS IDs).

The BS may schedule (/trigger) uplink channel/signal transmission (e.g., PUSCH/PUCCH/SRS) based on a specific analog beam (or BRS ID) for the terminal through predefined (physical layer) signaling.

For example, different uplink power control processes may be set (/cooperatively operated) for each of (M) analog beams (or BRS IDs). For example, a pathloss (PL) value associated with a particular uplink power control process may be performed through a beam reference signal (BRS) measurement associated with the corresponding uplink power control process.

Independent (or separate) transmit power control (TPC) accumulation operation may be set (/signaled) for each uplink power control process.

For example, M (multiple) analog beams (or BRS IDs) set (/signaled) for the UE may be analog beams for different (or the same) transmission and reception points (TRPs) (to which an uplink cooperative transmission (CoMP) operation is applied) or physical cells.

Interference pattern (/intensity) of an uplink channel/signal transmission, a channel state (on a frequency/time domain), a (traffic) load state, resource utilization, (resource) scheduling policy(pattern), and a timing advance (TA) value, and the like, may not be the same for each of (M) analog beams (or BRS IDs). This is so when (M) analog beams (or BRS IDs) related to (physical) cells (or TRPs) at different positions are set (/signaled), for example.

Therefore, as described above, in order to ensure (A) high reliability of uplink channels/signals transmitted through analog beams (or BRS IDs) of different characteristics (/(environments) and (B) efficient resource operation (/scheduling) for each analog beam (or each BRS ID), specific parameters related to uplink communication described hereinafter may be differently (or independently) set (/signaled) between (some or all) analog beams (or between new reference IDs for BRS ID beam measurement).

Figure 17:
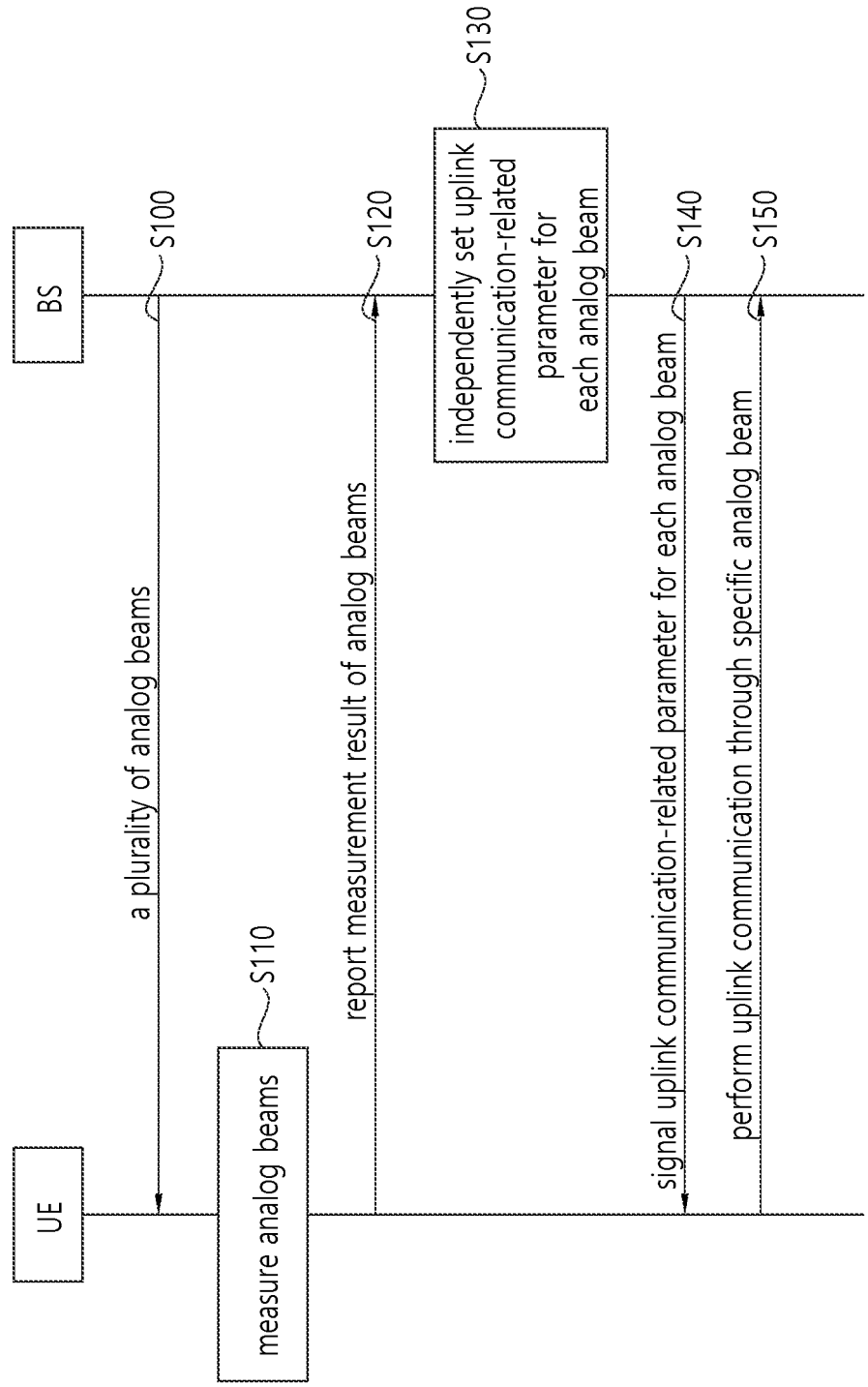
FIG. 17 illustrates a specific example in which the method of FIG. 16 is applied.

FIG. 17 illustrates a specific example in which the method of FIG. 16 is applied.

Referring to FIG. 17, the BS transmits a plurality of analog beams to a terminal (S100). Each analog beam may include a beam reference signal (BRS), and the beam reference signal may include a BRS ID distinguished between the analog beams.

The terminal measures the analog beams (S110) and reports measurement results of the analog beams to the BS (S120). For example, the terminal may report received power (BRSRP) information of a beam reference signal included in each analog beam to the BS.

The BS independently sets uplink communication-related parameters for each analog beam by referring to the measurement results (S130) and signals the set uplink communication-related parameters for each analog beam to the terminal (S140). For example, the uplink communication-related parameters per analog beam (or BRS ID) may be reset (/re-signaled) when a list of K higher (BRSRP-based) analog beams (or BRS IDs) for the terminal is changed (/updated).

For example, in a state in which first, second, and third analog beams are set for the terminal, if the analog beams set for the terminal are changed to the first, third, and fourth analog beams on the basis of the measurement results sent from the terminal, the BS signals the uplink communication-related parameters for each analog beam to the terminal.

When performing uplink communication through a specific analog beam, the terminal applies a parameter set in the specific analog beam to the uplink communication and then performs the uplink communication (S150).

When different uplink power control processes are established (/cooperatively operated) for each of M analog beams (or BRS IDs), application of the proposed rules below may be interpreted such that (uplink communication-related) (specific) parameters are differently (or independently) set (/signaled) when an uplink channel/signal based on all or some of the uplink power control processes.

In another example, a (uplink communication-related) (specific) parameter below may be equally (or commonly) set (/signaled) between (all or some of) analog beams (or BRS IDs) regardless of analog beam (or BRS ID) of different characteristics (/environments).

In another example, the (uplink communication-related) (specific) parameter (and/or TPC accumulation operation) (including open-loop power control parameter information (e.g., "P_O", "ALPHA", etc.) below may be set (/signaled) differently (or independently or commonly) for (some or all of) analog beams for each service communication (e.g., URLLC, EMBB, MMTC, etc.) of different characteristics (/numerology) (e.g., service quality (QOS)/latency requirements), TTI length, subcarrier spacing, etc.).

An (open-loop) power control parameter having a relatively high value may be set (/signaled) for a URLLC service with relatively high quality service requirements (and/or short latency requirements and/or short TTI lengths), compared with other service types. In this manner, reliability may be enhanced when a short TTI (URLLC) having a high power value is transmitted.

Examples (Examples #1-1 to #1-5) to be described hereinafter represent uplink communication-related parameters for each analog beam.

(Example #1-1): There is uplink control information (UCI) piggybacked to a PUSCH (UCI includes, for example, HARQ-ACK, CSI (RI/CQI/PMI), etc. An MCS offset value (BETA OFFSET) of the UCI may be an uplink communication-related parameter per analog beam described above.

For example, a relatively larger MCS offset value may be set (/signaled) for an analog beam (or BRS ID) in which interference with relatively high intensity is received or in which a received interference pattern (/characteristics) greatly changes, and a relatively smaller MCS offset value may be set (/signaled) for an otherwise analog beam (or BRS ID).

A seed (/input parameter) value related to at least one of (transmission) techniques applied to transmission (without UL-SCH) in which only an aperiodic triggering-based UCI is transmitted through a preset or signaled DCI format, UCI transmission (together with UL-SCH) based on a PUSCH piggyback, and PUSCH (data) transmission, an antenna port, a PUSCH (ZADOFF-CHU) reference signal sequence generation, PUSCH reference signal group (/sequence) hopping, and PUSCH scrambling (sequence) generator may be set (/signaled) differently between analog beams (or BRS IDs) having different characteristics (/environments).

A plurality of antenna port-based transmission diversity techniques (SFBC) may be set (/signaled) for an analog beam (or BRS ID) in which interference with a relatively high intensity is received or received and a received interference pattern (/characteristics) greatly changes.

When the above rules are applied, the UCI (and/or data) may be reliably transmitted regardless of analog beam (or BRS ID) switching.

(Example #1-2): At least one of (A) PUCCH resource (e.g., sequence (/cyclic shift), (PUCCH) resource block size/position, antenna port, etc.), (B) PUCCH format, (C) PUCCH transmission technique (e.g., (a plurality of antenna port-based) transmission diversity technique (SFBC), SORTD, etc.) and (D) PUCCH reference signal sequence (e.g., ZADOFF-CHU sequence) generation (PUCCH reference signal group (/sequence) hopping, PUCCH scrambling (sequence) generator)-related seed (/input parameter) value for UCI (e.g., HARQ-ACK, CSI (RI/CQI/PMI), etc.) transmission may be the uplink communication-related parameter described above.

A resource region (/interference intensity) in which (high) interference is received, a (downlink) load state, a (resource) scheduling type, etc., may be different for each analog beam (or each BRS ID). In consideration of this, it may be effective to set (/signal) a PUCCH resource, a PUCCH format, and a PUCCH transmission technique differently.

PUCCH transmission based on a transmission diversity technique (SFBC) (or SORTD) may be set (/signaled) for an analog beam (or BRS ID) in which interference having a relatively high intensity is received or in which a received interference pattern (/characteristics) greatly changes.

Information such as a PUCCH resource, a PUCCH format, a PUCCH transmission scheme, and the like, may be linked to a BRS ID through higher layer signaling or a physical layer signaling. For example, if BRS ID (or analog beam) information related to an uplink channel/signal transmission (or (BS) reception) is signaled through a DCI format (UL GRANT), it may be interpreted such that dynamic changes such as a PUCCH resource, a PUCCH format, a PUCCH transmission scheme, and the like, are supported through the corresponding DCI format.

Whether the PUCCH/PUSCH simultaneous transmission is set (/allowed), a power headroom type (e.g., TYPE 1/2), and the like, may be set (/signaled) differently between the analog beams (or BRS IDs) having different characteristics (/environments).

(Example #1-3) At least one of the following parameters may be an uplink communication-related parameter independently provided/set for each of the analog beams (or BRS IDs) described above:

(A) a power offset value applied to (aperiodic) SRS transmission, (B) a power offset value applied for each PUCCH format, (C) a power offset value applied to a PUCCH transmission diversity technique (or a power offset value applied for each PUCCH transmission technique), and (D) a power offset value (additionally) applied in consideration of a size of UCI payload transmitted with the PUCCH format together.

For example, when such a rule is applied, adaptive power control is possible for each analog beam (or BRS ID) of different (interference) characteristics (/environment). When the above rule is applied, if a MULTI-SHOT (aperiodic) SRS transmission for switching a plurality of preset (/signaled) analogue beams (or BRS IDs) is performed (/triggered), (aperiodic) SRS transmission power (or SRS UL PC process) applied for each analog beam (or BRS ID) may be (partially or entirely) different.

For example, a maximum allowed transmission power value (P_CMAX, C, B (here, CB value indicates a cell (/TRP) index, an analog beam index (BRS ID)) may be set (/signaled) differently between the analog beams (or BRS IDs) of the different characteristics (/environments).

For example, open-loop power control parameter information OLPC_PARA (e.g., "P_O", "ALPHA", etc.) may be set differently between the analog beams (or BRS IDs) (of different characteristics (/environments). In this case, (A) OLPC_PARA information related to the lowest (or highest or set (or signaled) (from the BS) BRS ID, (B) OLPC_PARA information related to an analog beam (or BRS ID) of (previously measured/reported) highest (or lowest or higher (or lower Qth) BRSRP (set (/signaled) (from the BS)), or (C) OLPC_PARA information related to a BRS ID set (/signaled) as a reference of path loss measurement is assumed as a reference value (REFER_OLPC), and OLPC_PARA information related to the other analog beams (or BRS IDs) may be informed as a difference value (DELTA) relative to the reference value.

For example, a (preset (/signaled)) OLPC_PARA (e.g., "P_O", "ALPHA", etc.) is commonly applied to a plurality of uplink power control processes (related to analog beams (or BRS IDs), and here, whether to apply a (preset (/signaled) power offset value may be indicated on a DCI format (e.g. UL GRANT) (related to scheduling of uplink channel/signal). Here, for example, the corresponding power offset value may be differently set (/signaled) for each analog beam (or BRS ID).

(Example #1-4): At least one of (A) UL-semi-persistent scheduling (SPS) transmission-related OLPC_PARA information (e.g., "P_O_SPS", "ALPHA SPS", etc.) for each analog beam (or BRS ID), (B) uplink semi-persistent scheduling setup/resource information (e.g., SPS period, (SPS) MCS/RB size and position, etc.), for each analog beam (or BRS ID), and (C) uplink semi-persistent scheduling hopping operation and setting information (e.g., SPS hopping bandwidth, etc.) may be a parameter related to uplink communication provided/set independently for each analog beam (or BRS ID) described above.

Independent (or separated) TPC accumulation operations may be set (/signaled) for each uplink SPS (power control) process interworking with a different analog beam (or BRS ID). For example, designating the uplink SPS OLPC_PARA information, the uplink SPS setup/resource information, the uplink SPS hopping operation, and the setup information differently between the analog beams (or BRS IDs) may be interpreted as setting (/signaling) a plurality of uplink SPS (power control) processes interworking with the different analog beams (or BRS IDs).

(Example #1-5): At least one of (A) (aperiodic) SRS resource/transmission type (/method) information (e.g., sequence, SRS (hopping) band, COMB, antenna port, SRS (ZADOFF-CHU) sequence generation-related seed (/input parameter) value), (B) uplink transmission mode (TM) information, (C) TA information (e.g., TAG setting (/signaling) may be performed in units of analog beams (or BRS IDs) may be a parameter related to uplink communication provided/set independently for the analog beams (or BRS IDs) described above.

The proposed schemes below propose methods for efficiently operating (/supporting) an uplink SPS operation in the NR system.

(Example #2-1) In the carrier aggregation (CA) situation of the existing LTE system, the uplink SPS operation is allowed (/set) only for a primary cell (PCELL), for example. In NR, the uplink SPS operation may be set (/signaled) only for the analog beam (or BRS ID) of the previously measured/reported highest (or lowest, or higher Qth (or W number of) BRSRP set or signaled from the BS). Or, the uplink SPS operation may be set (/signaled) only for the analog beam (or BRS ID) related to a lowest (or highest) BRS ID (or uplink power control process index) (or set (/signaled) from the BS). When this rule is applied, the uplink SPS operation may be performed with relatively high reliability.

Figure 18:
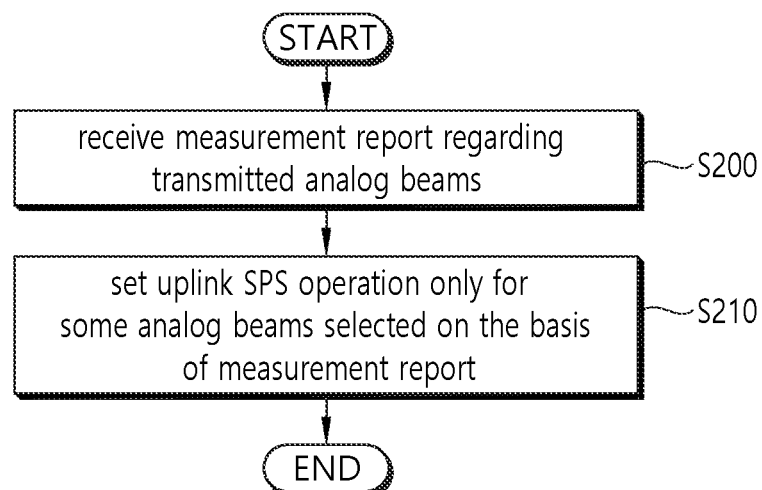
FIG. 18 illustrates a SPS setting method according to example #2-1.

FIG. 18 illustrates an SPS setting method according to Example #2-1.

Referring to FIG. 18, the BS receives a measurement report on transmitted analog beams (S200).

The BS sets the uplink SPS operation only for some selected analog beams based on the measurement report (S210). For example, the terminal may measure a BRSRP for a beam reference signal BRS included in the analog beams and then perform the measurement report only on W number of analog beams in order, starting from the largest value. In this case, referring to the measurement report, the BS may allow the uplink SPS operation or provide a setting for the uplink SPS operation only for M analog beams whose BRSRP value is equal to or greater than a threshold.

(Example #2-2) The BS may allow (the UE) to perform the uplink SPS operation (currently) on a specific analog beam (or BRS ID) (will be referred to as "CU_SPSBEAM") among a plurality of (e.g., two) analog beams (or BRS IDs) (which satisfy the condition of (Example #2-1)), and allow other analog beam (or BRS ID) (will be referred to as "FB_SPSBEAM")-based uplink SPS operation to be performed only when a preset (/signaled) event occurs (for example, when the CU_SPSBEAM is excluded from the analog beam (or BRS ID) list of higher (or lower) K BRSRPs or when (existing) BRSRP order of the CU_SPS-BEAM is changed) (or when a related signaling (/indicator) is received from the BS). For example, the FB_SPSBEAM may be interpreted as an analog beam (or BRS ID) for use in uplink SPS (operation) fallback.

The CU_SPSBEAM may be set (/signaled) to an analog beam (or BRS ID) of a relatively high (or low) BRSRP (or a BRS ID (or UL power control process index), relative to the FB_SPSBEAM. For example, the CU_SPSBEAM and the FB_SPSBEAM may be designated as the top highest (BEST) and a second highest BRSRP-related analog beam (or BRS ID) in turn.

(Example #2-3) The following (some or all of) information-related fields may be defined on a DCI format for uplink SPS activation and/or release.

For example, the RNTI information(s) related to DCI formats for activation or release of uplink SPS (aggregate/group) may be previously set (/signaled) for each analog beam (aggregate/group) or BRS ID (aggregate/group).

1) BRS ID information field (or uplink SPS process index information field). By defining this field, the uplink SPS operations related to a specific BRS ID (or uplink SPS process index) may be activated and/or released individually (/efficiently).

2) Timing (offset) information (K_OFFSET) field that the uplink SPS operation related to the specific BRS ID (or uplink SPS process index) is actually activated and/or released from a timing (e.g., SF #N) for receiving a DCI format for activating and/or releasing the uplink SPS (for example, uplink SPS is actually activated and/or released at an SF #(N+K_OFFSET) timing).

3) Uplink SPS activation and/or release indication field.

These fields may be useful in signaling activation and release of the uplink SPS using a common (or the same) DCI format (/structure).

(Example #2-4) When a preset (/signaled) event (e.g., (link)quality of an analog beam (or BRS ID) on which the UL SPS operation is performed) is lower than a preset (/signaled) threshold value, or a BRSRP (RNAKING) value is lower than a preset(/signaled) threshold value, or when a (degradation) variation of the BRSRP is greater than a preset (/signaled) threshold value, the UE may provide information of requesting release of the uplink SPS operation related to a specific BRS ID (or uplink SPS process index) or information indicating that the uplink SPS operation related to a specific BRS ID (or uplink SPS process index) is unstable, or information of requesting to an uplink SPS operation based on other BRS ID (or uplink SPS process index) (to the BS) through a preset or signaled channel/signal (e.g., through a scheduling request (SR)).

(Example #2-5) In order to efficiently support an uplink SPS transmission operation based on different (or multiple) analog beams (or BRS IDs) (or uplink SPS (power control) process), the UE may be allowed to monitor a predefined or signaled (uplink SPS) TPC DCI format (which is similar to the DCI format 3/3A of the existing LTE system (in the DCI format, (only) TPC information fields, without a data scheduling information field) are defined).

For example, the (uplink SPS) TPC DCI format may be (blind-)decoded on the basis of a preset or signaled (UE group-common (/specific) RNTI and/or may be transmitted at a specific aggregation level (AL) on a preset or signaled (UE-specific or common) search space resource (or derived through a search space (SS) hashing function) having a (related) RNTI value as an input parameter.

For example, the BS may inform the terminal of field position (/index) information (on an (uplink SPS) TPC DCI format) in which a specific analog beam (or BRS ID) (or specific uplink SPS (power control) process)-related uplink SPS TPC information is signaled) is signaled (through higher (/physical) layer signaling).

The TPC DCI format related to the different analog beams (or BRS IDs) (or specific uplink SPS (power control) processes) may be (blind-)decoded (to a specific aggregation level) on (different (UE-specific or common) search space resource based on different (UE group-common (/specific) RNTI.

A PUCCH TPC DECI format for efficiently controlling PUCCH transmission power may be defined for each of different (or multiple) analog beams (or BRS IDs) (or for each uplink power control process).

(Example #2-6): In order to support (analog beam (or BRS ID) switching operation by allowing a specific uplink SPS process (setup) between multiple (preset (/signaled) analog beams (or BRS IDs), physical (/higher) layer signaling indicating uplink SPS transmission-related analog beam (or BRS ID) switching may be defined.

For example, the (physical layer) signaling for the intended use may be defined in a DCI (format) format. The BS may inform the terminal of a field location (/index) information to be monitored (on a corresponding DCI (format)) (through higher (/physical) layer signaling.

The UE may recognize the switching information of the analog beam (or BRS ID) related to the uplink SPS transmission through (corresponding) field monitoring.

The DCI format (having such a purpose) may be (blind-)decoded on the basis of a preset (/signaled) (UE group-common (/specific)) RNTI or may be transmitted (at a specific aggregation level) on a preset (/signaled) (UE-specific or common) search space resource (or derived through a search space hashing function having a (related RNTI value as an input parameter)).

It is obvious that the examples of the proposed method described above may also be included as one of the implementation methods of the present invention, and thus, may be regarded as a kind of proposed methods. In addition, the proposed schemes described above may be implemented independently or may be implemented by combining (or merging) some of the proposed schemes. For example, coverage of the system to which the proposed scheme of the present invention is applied may be extended to other systems than the 3GPP LTE system.

Figure 19:
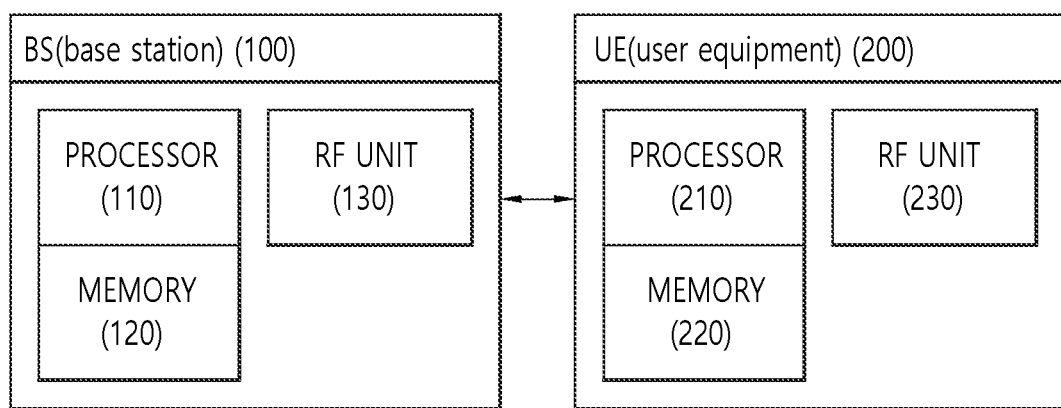
FIG. 19 is a block diagram illustrating an apparatus in which an embodiment of the present invention is implemented.

FIG. 19 is a block diagram illustrating an apparatus in which an embodiment of the present invention is implemented.

Referring to FIG. 19, a BS 100 includes a processor 110, a memory 120, and a radio frequency (RF) unit 130. The processor 110 implements the proposed functions, procedures, and/or methods. The memory 120 is connected to the processor 110 and stores various types of information for driving the processor 110. The RF unit 130 is connected to the processor 110 to transmit and/or receive a wireless signal.

A UE 200 includes a processor 210, a memory 220, and an RF unit 230. The processor 210 implements the proposed functions, processes, and/or methods. For example, the processor 210 may receive uplink communication-related parameters independently set for each analog beam, and apply the parameters to perform the uplink communication. In this case, when the uplink communication is performed using a specific analog beam, the uplink communication-related parameter set in the specific analog beam may be applied to the uplink communication. The memory 220 is connected to the processor 210 and stores various types of information for driving the processor 210. The RF unit 230 is connected to the processor 210 to transmit and/or receive a wireless signal.

The processor 110 or 210 may include an application-specific integrated circuit (ASIC), another chipset, a logic circuit, a data processing device, and/or a converter for converting baseband signals and wireless signals. The memory 120 or 220 may include read-only memory (ROM), random access memory (RAM), flash memory, a memory card, storage medium, and/or other storage devices. The RF unit 130 or 230 may include one or more antennas for transmitting and/or receiving wireless signals. When the embodiment is implemented in software, the above-described technique may be implemented as a module (process, function, etc.) that performs the above-described function. The module may be stored in memory 120 220 and executed by processor 110 or 210. The memory 120 or 220 may be within or outside the processor 110 or 210 and may be connected to the processor 110 or 210 by various well-known units.

What is claimed is:

1. A method of performing physical uplink control channel (PUCCH) transmission to a base station (BS) by a user equipment (UE) in a wireless communication system, the method comprising:
receiving, from the BS, a plurality of settings for the PUCCH transmission to the BS, wherein the plurality of settings are based on a plurality of reference signals;
receiving, from the BS, a signal informing of a setting among the plurality of settings for the PUCCH transmission to the BS, wherein the setting is based on a reference signal among the plurality of reference signals;
determining a transmission power for the PUCCH transmission based on at least one power control parameter included in the setting; and
performing the PUCCH transmission to the BS using the transmission power.

2. The method of claim 1, wherein the setting comprises information related to an identity of the reference signal.

3. The method of claim 1, wherein the at least one power control parameter comprises an open-loop power control parameter.

4. The method of claim 1, wherein the at least one power control parameter comprises information for a path loss.

5. The method of claim 1, wherein the at least one power control parameter comprises information for a transmit power control (TPC) accumulation operation.

6. A user equipment (UE) configured to perform physical uplink control channel (PUCCH) transmission to a base station (BS) in a wireless communication system, the UE comprising:
at least one transceiver;
at least one processor; and
at least one computer memory operably connectable to the at least one processor and storing instructions that, when executed, cause the at least one processor to perform operations comprising:
receiving, from the BS, a plurality of settings for the PUCCH transmission to the BS, wherein the plurality of settings are based on a plurality of reference signals;
receiving, from the BS, a signal informing of a setting among the plurality of settings for the PUCCH transmission to the BS, wherein the setting is based on a reference signal among the plurality of reference signals;
determining a transmission power for the PUCCH transmission based on at least one power control parameter included in the setting; and
performing the PUCCH transmission to the BS using the transmission power.

7. The UE of claim 6, wherein the setting comprises information related to an identity of the reference signal.

8. The UE of claim 6, wherein the at least one power control parameter comprises an open-loop power control parameter.

9. The UE of claim 6, wherein the at least one power control parameter comprises information for a path loss.

10. The UE of claim 6, wherein the at least one power control parameter comprises information for a transmit power control (TPC) accumulation operation.

11. A method of receiving a physical uplink control channel (PUCCH) by a base station (BS) in a wireless communication system, the method comprising:
transmitting, to a user equipment (UE), a plurality of settings for the PUCCH transmission by the UE to the BS, wherein the plurality of settings are based on a plurality of reference signals;
transmitting, to the UE, a signal informing of a setting among the plurality of settings for the PUCCH transmission to the BS, wherein the setting is based on a reference signal among the plurality of reference signals; and
receiving, from the UE, the PUCCH of which transmission power is determined based on at least one power control parameter included in the setting.

12. The method of claim 11, wherein the setting comprises information related to an identity of the reference signal.

13. The method of claim 11, wherein the at least one power control parameter comprises an open-loop power control parameter.

14. The method of claim 11, wherein the at least one power control parameter comprises information for a path loss.

15. The method of claim 11, wherein the at least one power control parameter comprises information for a transmit power control (TPC) accumulation operation.

* * * * *